(No Model.)
O. B. SHALLENBERGER.
ELECTRICAL INDICATOR FOR ALTERNATING ELECTRIC CURRENTS.
No. 383,668. Patented May 29, 1888.
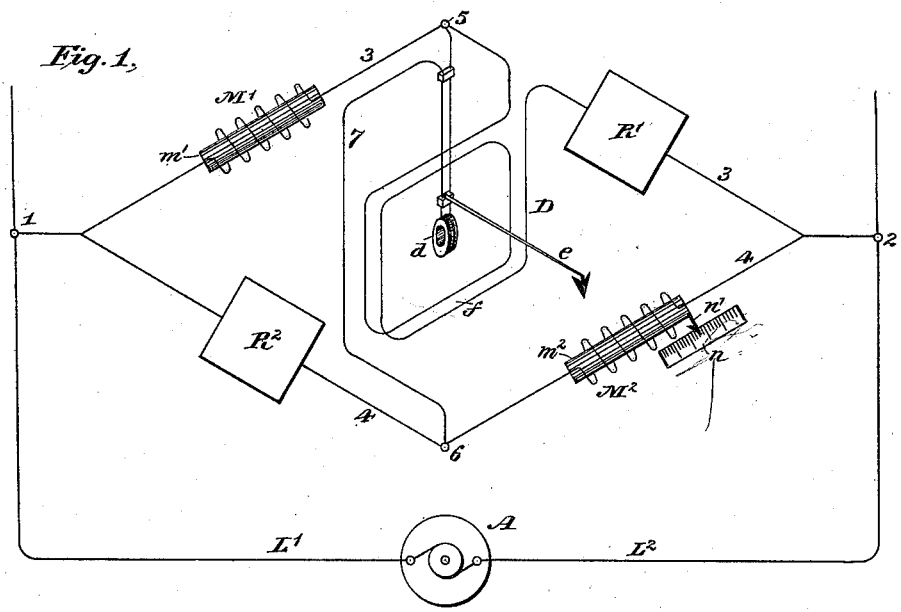
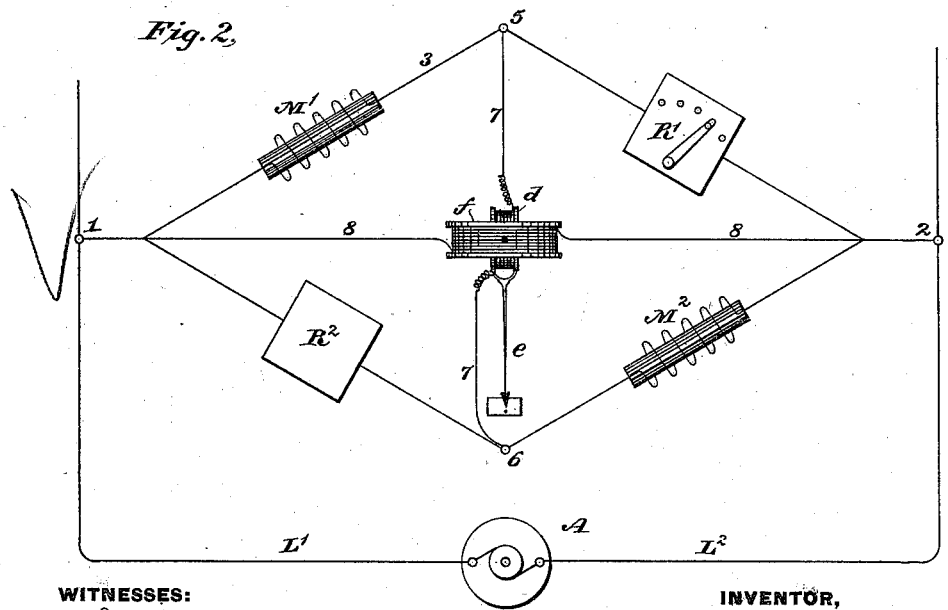
WITNESSES:
INVENTOR,
O. B. Shallenberger
by
Pope Edgecomb & Terry. Att'ys.

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

ELECTRICAL INDICATOR FOR ALTERNATING ELECTRIC CURRENTS.

SPECIFICATION forming part of Letters Patent No. 383,668, dated May 29, 1888.

Application filed January 21, 1888. Serial No. 261,466. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Electrical Indicators for Alternate-Current Electric Circuits, (Case 185,) of which the following is a specification.

The invention relates to the class of electrical apparatus employed for indicating the strength of current upon an electric circuit.

The object of the invention is to provide convenient, effective, and reliable means for determining the difference of potential existing between two given points in an electric circuit supplied with alternating, intermittent, or pulsatory electric currents.

The present invention relates particularly to that form of indicator in which a Wheatstone bridge or equivalent circuit is so organized that when currents of the character named are caused to traverse it a counter electro-motive force will be developed in one or more of the conductors, which will increase the apparent resistance thereof. This counter electro-motive force will increase and decrease as the applied electro-motive force varies. By properly organizing the indicating-circuits such changes in the distribution of the differences of potential may be secured as to effect the proper operation of the indicating apparatus. In a bridge arranged in this manner current flows across the indicator-circuit when the difference of potential of the line is either above or below normal; but since this current is alternating its effect upon such instruments as are ordinarily used as indicators would be the same whether the difference of potential of the circuit be too high or too low.

This invention provides an organization such that the indicator is deflected in a definite manner, such as will indicate either an increase or decrease from normal difference of potential.

Although the invention is especially applicable to a bridge containing inductors, as described, it is evident that other equivalent devices, as incandescent lamps, may be used in their stead.

In the accompanying drawings, Figure 1 is a diagram illustrating an organization of apparatus for carrying out the invention, and Fig. 2 illustrates a modification.

Referring to these figures, A represents a source of alternating, intermittent, or pulsatory electric currents, and $L'$ $L^2$ represent main-line conductors derived therefrom and leading to any desired work-circuit. Between the lines $L'$ $L^2$ there is connected an indicating apparatus for determining the difference of potential existing at the points 1 2 upon these conductors. Two conductors, 3 and 4, connect the points 1 and 2. From a point, 5, in the conductor 3 to a point, 6, in the conductor 4 there leads a conductor, 7. This conductor 7 includes in its circuit a coil, $d$, of the indicating device D. It is designed that this coil $d$ shall be turned in one direction or the other, accordingly as the difference of potential rises above or falls below the desired normal point. The coil $d$ is supported in any convenient manner and carries an indicator, $e$.

In the conductor 3, between the points 2 and 5, there is included a coil of high self-induction, $M'$, having a given law of variation of counter electro-motive force under changes in the current traversing it. A similar coil, $M^2$, is included in the conductor 4 between the points 2 and 6. The coils are respectively provided with cores $m'$ and $m^2$, of soft iron.

Two resistances, $R'$ and $R^2$, are respectively included in the conductors 3 and 4 between the points 2 and 5 and 1 and 6. The respective coils and resistances are located in a manner similar to the four arms of a Wheatstone bridge. The parts are so organized that when the difference of potential between the points 1 and 2 is normal the points 5 and 6 are at the same difference of potential, and therefore no current will traverse the conductor 7. If, however, the difference of potential at the points 1 and 2 is increased, then a corresponding change in the counter electro-motive force of the coils $M'$ and $M^2$ will take place. Thus their apparent resistance may be decreased in a greater ratio than that of the resistances $R'$ and $R^2$, the latter remaining approximately constant. Therefore a difference of potential will exist between the points 5 and 6, which will cause currents to traverse the conductor 7 in a given direction with reference to the main current at that moment. If, on the other hand, the difference of potential decreases, then the apparent resistance of the coils M' and M² will increase in a greater ratio than that of the resistances R' and R², and consequently a current will traverse the conductor 7 in the opposite relative direction.

For the purpose of causing the currents which thus traverse the conductor 7 and the coil $d$ to indicate whether the potential has increased or decreased a second coil, $f$, is placed in inductive relation with reference to the coil $d$. This coil $f$ may be included in some portion of the circuit where the direction of the current will remain the same with relation to that in the circuit L' L², notwithstanding the change in the relative direction of current through the conductor 7. Thus, in Fig. 1, it is placed in the conductor 3 between the points 2 and 5. From this it will follow that if the coil $d$ is normally placed at right angles to the coil $f$ and is free to turn it will move in one direction if the currents through the conductor 7 are in a given direction, and will move in the opposite direction when the currents through the conductor 7 are in the other direction. In other words, the coil $f$ has a fixed relation to the currents in the general circuit, while the coil $d$ is traversed by currents in the same direction or the opposite at any instant, accordingly as the difference of potential is above or below the normal.

Instead of connecting the coil $f$ in the conductor 3 as described with reference to Fig. 1, it may be connected between the points 1 and 2, as shown in Fig. 2, by an independent conductor, 8. In other respects the organization in Fig. 2 is essentially the same as that described with reference to Fig. 1.

The cores of the self-induction coils M' or M² may be made adjustable, if desired. Thus the core $m^2$, Fig. 1, is shown as being capable of being withdrawn from the coil, and a scale, $n$, and pointer $n'$ serve to designate the degree to which the core is withdrawn.

Instead of the coils M' M², any equivalent device may be employed, provided a change in the difference of potential across 5 6 is produced by variation of the difference of potential of the line L' L².

Instead of making the coil M² adjustable, one of the resistances, as R', Fig. 2, may be adjustable.

I claim as my invention—

1. The combination of an indicator acted upon by variations in alternating, intermittent, or pulsatory electric currents to indicate such currents, two self-induction devices and two resistances respectively in branch circuits spanning one of said self-induction devices and said indicator and the other of said induction devices and the indicator.

2. The combination of two branch conductors, a self-induction device and a resistance in one branch, the former being adjacent to the branching-point, a self-induction device and a second resistance in the other branch, the latter being adjacent to said branching-point, a conductor uniting points in the respective branches between the corresponding self-induction device and resistance, and an electric indicator operated by alternating, intermittent, or pulsatory currents connected in the last-named conductor.

3. An indicator for alternating, intermittent, or pulsatory electric currents, consisting of the combination, with the lines L' and L², of the conductors 3 and 4, leading from the points 1 and 2 in the respective lines, the self-induction device M' and the resistance R' in one of said conductors, the induction device M² and the resistance R² in the other of said conductors, a conductor, 7, connecting the conductors 3 and 4 at points 5 and 6, the coil $d$ in the conductor 7, and the coil $f$, included in a portion of the circuit receiving currents constant in their relative direction with reference to the circuit L' L².

4. An indicator for alternating, intermittent, or pulsatory electric currents, consisting of a movable and a fixed coil in inductive relation to each other, a Wheatstone bridge, in the bridge-conductor of which one of said coils is situated, a self-induction device and a resistance in one arm of the Wheatstone bridge, and upon opposite sides of the point at which the bridge-conductor is united therewith, a resistance in a portion of the other arm which spans the coil thus situated and said self-induction device, and a second self-induction device in a portion of the second arm spanning said coil and the first-named resistance.

5. The combination, with the main-line conductors of a system of electric distribution, of an electric indicator for alternating, intermittent, or pulsatory electric currents, consisting of a movable and a fixed coil in inductive relation to each other, two self-induction devices, a conductor in which they are connected, devices for opposing the flow of current, respectively connected, one in a branch circuit spanning one of said indicating-coils and one of said self-induction devices and the other in a branch circuit spanning the last-named indicating-coil and one of said self-induction devices, and a conductor including the other indicating-coil leading to points in the respective main-line conductors, substantially as described.

6. The combination, with an electric circuit, of an electric indicator operated by alternating, intermittent, or pulsatory currents traversing its coils, a conductor connecting points of different potential in said circuit, a self-induction device and a resistance located in said conductor, a second conductor connecting said points, a resistance and a self-induction device connected in the last-named conductor, the resistance being adjacent to the point to which the first-named self-induction device is adjacent, one of said self-induction devices being adjustable with reference to its self-inductive capacity, and a bridge-conductor uniting points of normally-equal potential in said conductors, in which said indicator is included.

7. The combination of a source of intermittent, alternating, or pulsatory electric currents, an electric circuit arranged as a Wheatstone bridge, an indicating-coil connected across said bridge, and a second coil in proximity to the first, connected independently thereof to the source of current.

8. The combination of a source of alternating, intermittent, or pulsatory electrical currents, an electrical circuit arranged as the arms of a Wheatstone bridge, and an indicator therefor, consisting of two coils, one connected across the points of equal potential thereof and the other connected independently to the source of current.

9. An indicator for alternating, intermittent, or pulsatory electrical currents, consisting of two resistance-circuits having points of equal normal difference of potential, an indicating-coil connected between said points, and a second coil establishing a field of force connected in circuit between points at which the direction of flow of current is independent of the direction of flow of the current in the resistance-circuits.

10. The combination of a circuit traversed by alternating, intermittent, or pulsatory currents, two branch circuits connected therewith and adapted to vary their relative distribution of difference of potential under variations in the difference of potential of the main circuits, a coil of wire connected across two intermediate points on said branch circuits, a second coil connected in shunt to the main circuit, and an indicating device affected by the combined currents in the two coils.

In testimony whereof I have hereunto subscribed my name this 10th day of January, A. D. 1888.

OLIVER B. SHALLENBERGER.

Witnesses:
W. D. UPTEGRAFF,
DANL. W. EDGECOMB.